United States Patent
Maiwald

(10) Patent No.: US 10,469,017 B2
(45) Date of Patent: Nov. 5, 2019

(54) METHOD FOR OPERATING AN ELECTRICAL MACHINE AND ELECTRICAL MACHINE

(71) Applicant: AUDI AG, Ingolstadt (DE)

(72) Inventor: Stefan Maiwald, Ingolstadt (DE)

(73) Assignee: AUDI AG, Ingolstadt (DE)

( * ) Notice: Subject to any disclaimer, the term of this patent is extended or adjusted under 35 U.S.C. 154(b) by 0 days.

(21) Appl. No.: 15/942,935

(22) Filed: Apr. 2, 2018

(65) Prior Publication Data

US 2018/0331649 A1 Nov. 15, 2018

(30) Foreign Application Priority Data

May 15, 2017 (DE) .......... 10 2017 208 093

(51) Int. Cl.
*H02P 27/08* (2006.01)
*H02P 23/14* (2006.01)
*G06F 17/13* (2006.01)

(52) U.S. Cl.
CPC ............ *H02P 27/085* (2013.01); *H02P 23/14* (2013.01); *G06F 17/13* (2013.01)

(58) Field of Classification Search
CPC .... H02P 6/153; H02P 7/29; H02P 8/10; H02P 23/22; H02P 27/08; H02P 23/14; G06F 17/13
See application file for complete search history.

(56) References Cited

U.S. PATENT DOCUMENTS

| | | | | |
|---|---|---|---|---|
| 5,739,650 A * | 4/1998 | Kimura | ................ | H02P 6/08 318/400.07 |
| 6,850,027 B2 * | 2/2005 | Kuwano | ................ | H02P 8/14 318/685 |
| 2008/0157530 A1 * | 7/2008 | Corcelles Pereira | ..... | H02J 3/18 290/44 |
| 2008/0218111 A1 * | 9/2008 | Okamura | ............ | H02P 21/0089 318/453 |
| 2013/0049652 A1 * | 2/2013 | Namikawa | ................ | H02P 6/08 318/400.02 |
| 2014/0375236 A1 * | 12/2014 | Kim | ................ | H02P 21/06 318/400.04 |

FOREIGN PATENT DOCUMENTS

| | | |
|---|---|---|
| AT | 508854 A2 | 4/2011 |
| DE | 11 2009 002 086 T5 | 7/2011 |
| DE | 10 2011 053 961 A1 | 3/2013 |
| DE | 10 2012 224 162 A1 | 7/2014 |
| DE | 102014106667 A1 | 4/2015 |
| JP | 2015019562 A * | 1/2015 ............. H02P 27/08 |

OTHER PUBLICATIONS

Extended European Search Report dated Oct. 19, 2018, in connection with corresponding EP Application No. 18163264.7 (17 pgs., including machine-generated English translation).

* cited by examiner

*Primary Examiner* — Eduardo Colon Santana
*Assistant Examiner* — Said Bouziane
(74) *Attorney, Agent, or Firm* — Maier & Maier, PLLC

(57) ABSTRACT

A method for operating an electrical machine, wherein an inverter of the electrical machine is actuated by a pulse width modulation. In one case, it is provided that a pulse duty factor for the pulse width modulation is determined from a voltage value (d) that is dependent on the desired rotational speed as well as a time-dependent angle value ($\alpha$). Embodiments of the invention further relate to an electrical machine.

8 Claims, 1 Drawing Sheet

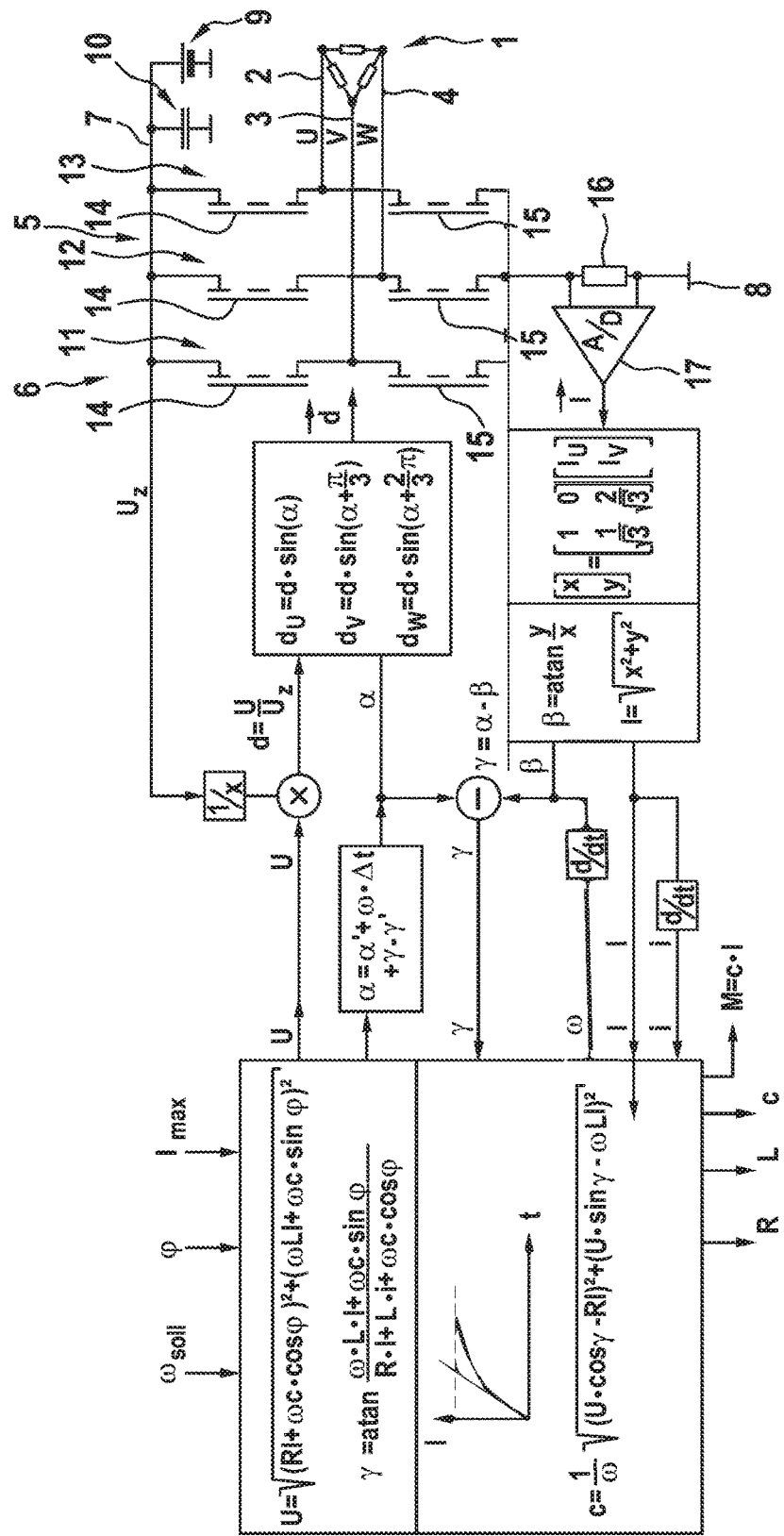

METHOD FOR OPERATING AN ELECTRICAL MACHINE AND ELECTRICAL MACHINE

FIELD

The invention relates to a method for operating an electrical machine, wherein an inverter of the electrical machine is actuated by means of pulse width modulation. The invention further relates to an electrical machine.

BACKGROUND

The electrical machine can fundamentally be designed in any way and utilized in any field. Especially preferred, the electrical machine finds use in the motor vehicle sector, in particular as a traction machine for a motor vehicle. The electrical machine is preferably designed as a synchronous machine, in particular as a three-phase synchronous machine. Preferably, the electrical machine is permanently excited. However, it is also possible to provide an electrical excitement. For example, the electrical machine is present as a brushless direct current motor, that is, a so-called BLDC motor.

The electrical machine is multiphase in construction, wherein the inverter associated with the electrical machine is provided for actuating the individual phases of the electrical machine. The inverter has a plurality of strands, namely, preferably just as many as the phases of the electrical machine. Arranged in each of the strands is at least one switch; preferably, a plurality of switches is provided in each case. For example, in each of the strands, both a high-side switch and a low-side switch are formed, wherein each phase of the electrical machine is connected, respectively, between the high-side switch and the low-side switch to the corresponding strand of the inverter.

In this regard, each phase of the electrical machine is connected or can be connected by way of the high-side switch of the corresponding strand to a first electric potential and by way of the low-side switch to a second electric potential. This means that, when the high-side switch is closed, the corresponding phase of the electrical machine is connected to the first electric potential and, when the high-side switch is open, the corresponding phase is decoupled from it. Analogously to this, when the low-side-switch is closed, the corresponding phase of the electrical machine is connected to the second electric potential and, when the low-side switch is open, the phase is decoupled from it. For example, the electrical machine has three phases and, accordingly, the inverter has three strands, so that, in a preferred embodiment, the inverter has three high-side switches as well as three low-side switches.

It is provided that the inverter is actuated by means of pulse width modulation. In this case, a pulse duty factor is determined and adjusted at the inverter. For example, each of the switches, that is, preferably each of the high-side switches as well as each of the low-side switches, is actuated using a respective pulse duty factor. For example, for each of the strands or for each of the phases, a separate pulse duty factor is determined. However, it can also be provided that only a single pulse duty factor is determined and subsequently used for actuating the strands or phases, respectively. It is noted that, also in the determination of a plurality of pulse duty factors, said factors can obviously take on the same value, at least temporarily.

It can be provided, for example, that the electrical machine is actuated or controlled by means of a field-oriented control or a vector control, respectively. The field-oriented control has a rotating vector system and, as input values, the non-rotating currents $I_d$ and $I_q$. The physical actuation of the electrical machine occurs from an intermediate circuit voltage by means of pulse width modulation. The pulse duty factor of the pulse width modulation is formed by means of classical control loops from an actual current intensity and a desired current intensity. Because, via the electrical machine, the current intensity of the electric current is proportional to its torque, it is possible by means of the pulse width modulation to adjust a constant torque for a constant desired current intensity.

When, however, for example, the electrical machine is adjusted or is to be adjusted to a desired rotational speed, this then requires a master control loop, from which a cascade control results. In other words, first of all, an actual rotational speed of the electrical machine is regulated to a desired rotational speed, from which a desired torque or a desired current intensity results. Subsequently, the actual current intensity of the electric current flowing through the electrical machine is adjusted to the desired current intensity.

SUMMARY

The object of the invention is to propose a method for operating an electrical machine, which, in comparison to known methods, has advantages, in particular a faster response to a change in a desired value, such as, for example, the desired rotational speed.

In this case, it is provided that a pulse duty factor for the pulse width modulation is determined from a voltage value that is dependent on the desired rotational speed as well as an angle value that is dependent on time.

In this regard, the factor by means of which the inverter of the electrical machine is actuated is not determined by means of regulation. A classical control loop is not provided here. Instead, the pulse duty factor is calculated geometrically. Controlled values and, overall, the behavior of a compensation controller (dead-beat response) thereby result. As a result, the electrical machine responds extremely fast to changes in the desired value or in a corresponding actual value of the electrical machine. In contrast to the above-discussed field-oriented control, in this respect, there is a voltage-oriented control (VOC).

The pulse duty factor is determined, on the one hand, from the rotational speed-dependent voltage value. Because the rotational speed of the electrical machine is proportional to the effective voltage applied to it, there is a specified rotational speed in this respect. This is advantageous, for example, in the case of a traction machine, because, when the motor vehicle is started up, it is possible to adjust a slippage faster and more precisely, so that, overall, the acceleration of the vehicle from low rotational speeds, in particular from standstill, is increased.

In addition to the voltage value, the pulse duty factor is also based on the angle value. Said angle value is time-dependent; that is, it is determined as a function of time. The voltage value and the angle value serve as input values in the determination of the pulse duty factor, whereas the pulse duty factor is obtained as an output value. For example, it is provided that a space vector, which contains values associated with the phases of the electrical machine, is determined solely from the voltage value and the angle value. For example, the components of the space vector are obtained from the following relations for a three-phase electrical machine:

$$d_U = d \cdot \sin(\alpha)$$

$$d_V = d \cdot \sin(\alpha + \pi/3)$$

$$d_W = d \cdot \sin(\alpha + 2/3\pi).$$

Subsequently, on the basis of the space vector with the mentioned components, the pulse duty factor is determined or the pulse width modulation of the inverter is carried out, respectively. The voltage value d is hereby obtained, for example, from the relation $$d = U/U_z,$$

where U is a desired voltage and $U_z$ is an intermediate circuit voltage. The intermediate circuit voltage is here preferably the difference between the first potential and the second potential, as mentioned above.

In the scope of another embodiment of the invention, it is provided that, as the voltage value, a ratio of a desired voltage to an intermediate circuit voltage is used, wherein the desired voltage is determined from at least one characteristic value of the machine as well as a desired rotational speed. Reference has already been made to the use of the voltage value in the form of the ratio between the desired voltage and the intermediate circuit voltage. The intermediate circuit voltage is the actual voltage of the intermediate circuit or the difference in the voltage, respectively, between the first potential and the second potential. The desired voltage, in contrast, is determined from the at least one characteristic value of the machine as well as the desired rotational speed.

The desired rotational speed can be variable and may be specified externally. In contrast, the characteristic value of the machine relates to the electrical machine and is thus an intrasystem value. The characteristic value of the machine is preferably constant or changes only slowly, depending, for example, on the aging of the electrical machine and/or of the inverter. In this respect, the characteristic value of the machine may insofar also be referred to as a motor constant.

In the scope of another embodiment of the invention, it can be provided that a field attenuation value is additionally taken into consideration in determining the desired voltage. The field attenuation value is present, for example, in the form of an angle, in particular in the form of the angle between a voltage induced in the electrical machine and its actuating voltage, which is applied to it by means of the inverter. The induced voltage is also referred to as a counter EMF, wherein EMF stands for electromotive force. For example, the field attenuation angle is the difference angle between the counter EMF, multiplied by the characteristic value or motor constant of the machine, on the one hand, and the actuating voltage, on the other hand. If a field attenuation value of zero is chosen, then, with an actuating voltage U, the characteristic curve of a collector motor is obtained. By use of the field attenuation value, it is possible to adjust a specific field attenuation.

An enhancement of the invention provides that the angle value is summed up, wherein, as summand, a product of a desired rotational speed and a time difference is used. Summed up is understood to mean that, from the previous value of the angle value and the summand, a new value for the angle value is determined. In other words, the new value of the angle value is obtained from the previous value of the angle value plus the summand. Summed up is understood to mean the actual formation of a sum between the previous value of the angle value and the summand or alternatively an integration, that is, a summation with infinitesimally small time difference.

The summand taken for the summation is the product of a desired rotational speed and the time difference. As already explained above, the desired rotational speed is a value specified in advance. The time difference describes, in contrast, the difference in time between individual control steps of the method. In a first control step, the angle value has its previous value and, in the next control step, its new value. The time difference is constant, for example, during the operation of the electrical machine. The control steps thus follow one another in succession at a specific frequency, namely, the control frequency. For example, the control frequency corresponds to the frequency of the pulse width modulation, by means of which the inverter is actuated. As the control frequency, for example, a frequency of 1 kHz to 50 kHz is used, preferably a frequency of at least 5 kHz, at least 10 kHz, or at least 20 kHz.

Another advantageous embodiment of the invention provides that, as an additional summand in the summation of the angle values, a difference between a first angle and a second angle is used, wherein the first angle is determined from the desired rotational speed and the field attenuation value, and the second angle corresponds to the previous value of the first angle or is determined from measured phase currents through the inverter. For example, the new value of the angle value $\alpha$ is determined from the following relation:

$$\alpha = \alpha' + \omega \Delta t + \gamma - \gamma'.$$

Here, $\alpha$ is the new value of the angle value, $\alpha'$ is the previous value of the angle value, $\omega$ is the desired rotational speed, $\Delta t$ is the time difference, $\gamma$ is the first angle, and $\gamma'$ is the second angle. The first angle is preferably calculated from the desired rotational speed and the field attenuation value, wherein, for example, the following relation is drawn on:

$$\gamma = a\tan((\omega L I + \omega c \cdot \sin \varphi)/(RI + L \cdot dI/dt + \omega c \cdot \cos \varphi))$$

Here, $\omega$ is the desired rotational speed, L is the inductance of the electrical machine, I is the actual current, dI/dt is a time derivative of the actual current, c is the motor constant, and $\varphi$ is the field attenuation value or the field attenuation angle, respectively. The second angle then corresponds to, for example, the value of the first angle in a preceding control step, in particular the directly preceding control step or the last control step.

However, it can also be provided that the second angle is determined from measured values—for example, from measured phase currents through the inverter. In this case, the measured phase currents are converted, preferably by means of a Clarke transformation, into a real part and an imaginary part. From the real part and the imaginary part, an angle can then be calculated, with the second angle being obtained from the difference between the angle value and this angle.

Another embodiment of the invention provides that the phase currents are converted by means of a Clarke transformation into a real part and an imaginary part. Reference to this has already been made briefly above. For example, only two of the phase currents are measured, in particular the phase currents $I_U$ and $I_V$. On account of the prerequisite that, at each point in time, the sum of the polyphase-line currents is equal to zero, it is possible to calculate the real part x and the imaginary part y from the following relation:

$$\begin{bmatrix} x \\ y \end{bmatrix} = \begin{bmatrix} 1 & 0 \\ 1/\sqrt{3} & 2/\sqrt{3} \end{bmatrix} \begin{bmatrix} I_U \\ I_V \end{bmatrix}$$

The actual current intensity of the electric current that flows through the electrical machine can then be determined from the relation $$I=\sqrt{x^2+y^2},$$

whereas the angle $\beta$, already mentioned above, is obtained from the relation $$\beta = a\tan(y/x).$$

From the angle $\beta$, by means of the derivative with respect to time, it is possible to determine the actual rotational speed $\omega$ of the electrical machine.

Another preferred embodiment of the invention provides that, as a second angle, a difference between the angle value and an angle determined from the real part and the imaginary part is used. Reference to this has already been made above. In this case, the second angle is calculated by means of the relation $$\gamma' = \alpha - \beta.$$

Another embodiment of the invention provides that an actual rotational speed is calculated from the angle by means of the derivative with respect to time and/or that, from the real part and the imaginary part, an actual current intensity and/or an actual current intensity gradient is/are determined. In this case, it is possible to calculate different values of the electrical machine from the phase currents, namely, different actual values. On the one hand, the actual rotational speed is obtained from the angle that was determined from the real part and the imaginary part by means of the derivative with respect to time. In this case, the angle is preferably determined on the basis of the relation $$\beta = a\tan(y/x).$$

The current intensity is obtained, in contrast, from the relation $$I=\sqrt{x^2+y^2}.$$

Through the derivation of the actual current intensity, it is possible, in addition, to calculate the actual current intensity gradient $dI/dt$.

Finally, in the scope of another preferred embodiment of the invention, it is provided that, during a calibrating operation of the electrical machine, at least one machine-specific machine value is determined. The calibrating operation is preferably carried out at least during an initial startup of the electrical machine, but, especially preferred, routinely during operation of the electrical machine. In the scope of the calibrating operation, the at least one machine-specific machine value is determined—for example, the characteristic value of the machine, in particular the motor constant, which may be indicated by the formula symbol c. However, it can also be provided that, as a machine value, the inductance or a resistance of motor windings of the electrical machine is employed. Because the resistance changes with the temperature of the electrical machine or of the winding, it is possible to derive the winding temperature from the resistance.

Obviously, the invention further relates to an electrical machine, in particular for carrying out the method in accordance with the preceding statements, wherein an inverter of the electrical machine can be actuated by means of pulse width modulation. In this case, it is provided that the electrical machine is designed to determine a pulse duty factor for the pulse width modulation from a voltage value that is dependent on the desired rotational speed as well as an angle value that is dependent on time.

The advantages of an approach of this kind or to an embodiment of the electrical machine of this kind have already made. Both the electrical machine and the method for the operation thereof can be further developed in accordance with the preceding statements, so that reference is made to said statements in this regard.

BRIEF DESCRIPTION OF THE DRAWING

The invention is explained in detail below on the basis of the exemplary embodiments illustrated in the drawing, without any limitation of the invention thereby occurring. The sole FIGURE herein shows:

FIG. 1 a schematic illustration of an operating method for an electrical machine.

DETAILED DESCRIPTION OF THE DRAWING

The FIGURE shows a schematic illustration of an operating method for an electrical machine 1, which, in this case, has a three-phase design purely by way of example, and, in this respect, has three phases 2, 3, and 4, also referred to as U, V, and W. The electrical machine is actuated by means of an inverter 5, by way of which the electrical machine 1 can be connected electrically to an intermediate circuit 6. The intermediate circuit 6 has a first electric potential 7 and a second electric potential 8. For supplying the first potential 7, it is possible, for example, to provide a voltage source 9, which is only indicated here. In addition, for voltage stabilization, a buffer storage 10, such as, for example, a capacitor, is optionally associated with the intermediate circuit 6 or connected to it.

The inverter 5 has a number of phases 2, 3, and 4 of the electrical machine 1 that corresponds to a number of strands 11, 12, and 13. Each of the strands 11, 12, and 13 has, respectively, a high-side switch 14 and a low-side switch 15. The high-side switches 14 are connected, respectively, on the one hand, to the first potential 7 and, on the other hand, to one of the phases 2, 3, or 4 of the electrical machine 1. In contrast, the low-side switches 15 are connected, on the one hand, to one of the phases 2, 3, or 4 of the electrical machine 1 and, on the other hand, to the second potential 8. The latter can be realized via a shunt 16, by means of which phase currents can be measured through the phases 2, 3, and 4 of the electrical machine.

An actuation of the inverter 5 for operation of the electrical machine 1 is effected by means of pulse width modulation. In this case, a space vector is determined, having the components $d_U$, $d_V$, and $d_W$, which are associated with the individual phases 2, 3, and 4 of the electrical machine 1. Each of the components is calculated from a voltage value d that is dependent on the desired rotational speed d and a time-dependent angle value $\alpha$. The relations used for the calculation are:

$$d_U = d \cdot \sin(\alpha)$$

$$d_V = d \cdot \sin(\alpha + \pi/3)$$

$$d_W = d \cdot \sin(\alpha + 2/3\pi).$$

The voltage value d is obtained here from a ratio between a desired voltage U and an intermediate circuit voltage $U_Z$ of the intermediate circuit.

The time-dependent angle value $\alpha$ is obtained by summation. Serving as an input value in this case is the previous value $\alpha$ of the angle, the desired rotational speed $\omega$, and a time difference $\Delta t$ between individual control steps. Furthermore, a first angle γ and a second angle γ' are taken into consideration. The first angle γ is calculated from the desired rotational speed ω and a field attenuation value φ on the basis, for example, of the relation $$\gamma = a\tan((\omega LI + \omega c \cdot \sin\varphi)/(RI + L \cdot dI/dt + \omega c \cdot \cos\varphi))$$

The second angle, in contrast, assumes the value of the first angle from the last control step. After the summation, the angle value α is set equal to the result of the summation.

The voltage value U is determined from at least one characteristic value of the machine as well as the desired rotational speed $\omega_{soll}$ [soll=desired], with the desired rotational speed also being referred to as ω in the scope of this description. For example, the voltage value U is determined from the relation $$U = \sqrt{(RI + \omega c \cdot \cos\varphi)^2 + (\omega LI + \omega c \cdot \sin\varphi)^2},$$

where R is a winding resistance of the electrical machine and I is an electric current, in particular a maximum electric current intensity $I_{max}$.

It has already been explained above that the shunt 16 is provided for the measurement of phase currents. The measured current intensities are digitized by means of an analog digital converter 17, for example, and subsequently converted by means of a Clarke transformation into a real part x and an imaginary part y, for example, determined by means of the relation $$\begin{bmatrix} x \\ y \end{bmatrix} = \begin{bmatrix} 1 & 0 \\ 1/\sqrt{3} & 2/\sqrt{3} \end{bmatrix} \begin{bmatrix} I_U \\ I_V \end{bmatrix}.$$

From the real part x and the imaginary part y, it is then possible to calculate an angle β. Through derivation of this angle β, the actual rotational speed ω can be determined. Furthermore, the actual current intensity I as well as the actual current intensity gradient can be calculated by means of the derivative with respect to time of the actual current intensity I. From the difference between the time-dependent angle value α and the angle β, an actual value of the angle γ is obtained. This actual value can be employed as the second angle γ' in the summation of the angle values. Additionally or alternatively, the actual value of the angle γ is used during a calibrating operation of the electrical machine 1.

During the calibrating operation, at least one machine-specific machine value is determined. As a machine value, it is possible to employ, for example, the winding resistance, which can be determined from the voltage value U as well as a current intensity $I_0$, with the current intensity $I_0$ being, for example, a current intensity that maximally arises during the operation of the electrical machine. The inductance L can be calculated, for example, from the relation L=Rτ, wherein τ is the time constant of the electrical machine, which is obtained inversely from the relation $$\tau = L/R$$

As another characteristic value of the machine, the motor constant c can be used, which, for example, is calculated from the relation $$c = \frac{1}{\omega}\sqrt{(U \cdot \cos\gamma - RI)^2 + (U \cdot \sin\gamma - \omega LI)^2}\,.$$

Finally, it is possible by use of the motor constant c to calculate the actual torque $M_{ist}$ of the electrical machine 1, namely, on the basis of the relation $$M_{ist} = cI, [ist=\text{actual}]$$

using the actual current intensity I.

By means of the described approach, a voltage-oriented control of the electrical machine 1 is realized, which can be produced without a sensor. This means that, for operation of the electrical machine 1, only a measurement of the current by means of the shunt 16 is effected. Obviously, additionally or alternatively, it is possible to employ a rotational speed sensor for measurement of the rotational speed ω. It is also possible to combine the described voltage-oriented control with other methods and/or, in a first rotational speed range, to incorporate the measurement of the actual current by means of the shunt 16, and, in another rotational speed range, to measure directly the actual rotational speed ω of the electrical machine 1 by means of a sensor.

The invention claimed is:

1. A method for operating an electrical machine, comprising:
   an inverter of the electrical machine is actuated by a pulse width modulation, wherein a pulse duty factor for the pulse width modulation is determined from a voltage value (d) that is dependent on the desired rotational speed as well as a time-dependent angle value (α), so that the electrical machine is actuated by a voltage-oriented control (VOC),
   wherein in that, in a summation of the angle value (α), as an additional summand, a difference between a first angle (γ) and a second angle (γ') is used, wherein the first angle (γ) is determined from the desired rotational speed (ω) and the field attenuation value (φ) and the second angle (γ') corresponds to the previous value of the first angle (γ) or is determined from measured phase currents (IU, IV) through the inverter.

2. The method according to claim 1, wherein in that, as the voltage value (d), a ratio of a desired voltage (U) to an intermediate circuit voltage (Uz) is used, wherein the desired voltage (U) is determined from at least one characteristic value of the machine (c) as well as the desired rotational speed (ω).

3. The method according to claim 2, wherein in that, in the determination of the desired voltage (U), a field attenuation value (φ) is additionally taken into account.

4. The method according to claim 1, wherein in that the angle value (α) is summed up, wherein, as a summand, a product of the desired rotational speed (ω) and a time difference (Δt) is used.

5. The method according to claim 1, wherein in that the phase currents ($I_U, I_V$) are converted by means of a Clarke transformation into a real part (x) and an imaginary part (y).

6. The method according to claim 1, wherein in that, as the second angle (γ'), a difference between the angle value (α) and an angle (β), which is determined from the real part (x) and the imaginary part (y), is used.

7. The method according to claim 6, wherein in that, from the angle (β), by means of the derivative with respect to time, an actual rotational speed (ω) is calculated, and/or in that, from the real part (x) and the imaginary part (y), an actual current intensity (I) and/or an actual current intensity gradient (dI/dt) is/are determined.

8. The method according to claim 1, wherein in that, during a calibrating operation of the electrical machine, at least one machine-specific machine value (c, R, L) is determined.

\* \* \* \* \*